2,824,869
SALT OF STREPTOMYCIN AND PHYTIC ACID

Frank Harold Buckwalter, De Witt, and Edmund S. Granatek, East Syracuse, N. Y., assignors to Bristol Laboratories Inc., Syracuse, N. Y., a corporation of New York No Drawing. Application August 4, 1954
Serial No. 447,904

3 Claims. (Cl. 260—210)

This invention relates to new and therapeutically useful salts of streptomycin which exhibit repository action upon injection and, more particularly, to streptomycin phytate.

It has been shown by Schatz, Bugie, Waksman, Proc. Soc. Exp. Biol. And Med. 55, 66–69 (1944), that streptomycin is obtained from elaboration products formed in the cultivation of the microorganism *A. griseus* in a suitable medium, by adsorption on activated carbon followed by elution with an acidic solvent. The products which are thus obtained include streptomycin trihydrochloride, $C_{21}H_{39}N_7O_{12} \cdot 3HCl$, and streptomycin sulfate, $(C_{21}H_{39}N_7O_{12})_2 \cdot 3H_2SO_4$. As discovered by Vander Brook et al., J. Biol. Chem. 165: 463–8 (1946), an eluting solution of five to ten percent acetone-water containing sufficient sulfuric acid to maintain pH 2.5 during elution is effective. In order to isolate the streptomycin sulfate as a solid material, it is necessary to add more than two volumes of acetone in order to raise the concentration of acetone in the solution to seventy-five percent. The use of such large volumes of solvent is expensive and impractical. As pointed out by Keefer and Anderson (Penicillin and Streptomycin in the Treatment of Infections, Oxford University Press, New York, 1950, page 938), all of the salts of streptomycin complex are biologically active. These salts are extremely soluble in isotonic solutions of sodium chloride or in sterile, pyrogen-free distilled water.

It was found by Peck et al., J. Amer. Chem. Soc., 67, 1866–1867 (1945) that the addition of calcium chloride to a methanolic solution of streptomycin trihydrochloride followed by removal of nearly all of the solvent by evaporation gives a solid, complex of formula $$(C_{21}H_{39}N_7O_{12} \cdot 3HCl) \cdot CaCl_2$$

which is also extremely soluble in water.

The salts of streptomycin which are relatively insoluble in water are all salts of organic acids of complex structure and relatively high molecular weight, such as helianthine (p-dimethylamino-phenylazobenzene-sulfonic acid) and orange II (p-(2-hydroxy-1-naphthylazo)-benzene-sulfonic acid). By virtue of their toxicity, these salts are not suitable for therapeutic use.

It has been found, e. g., Peck, Hoffhine and Folkers, J. Amer. Chem. Soc., 68, 1390 (1946) that catalytic hydrogenation of an acid salt of streptomycin with the absorption of one mole of hydrogen produces the corresponding salt of dihydrostreptomycin. This product shows equal therapeutic activity but reduced toxicity when compared with streptomycin. Two inorganic salts of dihydrostreptomycin have the formulae $$C_{21}H_{41}N_7O_{12} \cdot 3HCl$$

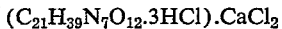

and $(C_{21}H_{41}N_7O_{12})_2 \cdot 3H_2SO_4$; both are extremely soluble in water. In the case of dihydrostreptomycin, it has been noted by Fried and Wintersteiner, J. Amer. Chem. Soc. 69, 79–86 (1947), that the procedure used to form the calcium chloride complex of streptomycin fails to form such a complex when applied to dihydrostreptomycin.

Bogert and Solomons, J. Amer. Chem. Soc., 75, 2355–2356 (1953), have reported several moderately water-insoluble salts of dihydrostreptomycin. Of these, the most insoluble in water was dihydrostreptomycin sulfate iodide, which had a solubility of about 65,250 units/ml. (potency 725γ/ mgm.; solubility 90 mgm./ml.). All attempts to prepare analogous water-insoluble salts of streptomycin were unsuccessful.

It is desirable that a salt of streptomycin be discovered which is both suitable for therapeutic administration and also relatively insoluble in water. Such insolubility in water facilitates both commercial preparation and certain types of therapeutic use. It is also desirable that such a salt by crystalline and chemically pure, so that it be susceptible to standardization by purely chemical and physical tests.

It is a further object of the present invention to provide a repository form of streptomycin, as none is presently available. Thus all present injectable forms of streptomycin provide blood levels for only a few hours, showing a peak in the beginning which may be harmfully high followed by a rapid drop. It is an additional object of the present invention to provide for repository use salts of streptomycin which are therapeutically active, non-toxic and relatively insoluble in water.

These objectives have been attained and there is now provided according to the present invention a salt of streptomycin and phytic acid, e. g., streptomycin phytate.

Inositol, cyclohexane-hexol, $C_6H_6(OH)_6$ can occur theoretically in seven active forms, two optically active forms and one racemic form, which differ in the relative positions of the hydroxyl groups, one of which is attached to each carbon atom. Both optically active forms and the racemic form are known with certainty together with several inactive forms. Inositolhexaphosphoric acid $(C_6H_{18}O_{24}P_6)$ is known as phytic acid; together with its salts, phytic acid has been isolated from natural sources, e. g. corn steep liquor, converted into various salts, e. g. iron, copper, calcium, magnesium, manganese, sodium, potassium, and ammonium, and converted into inositol and other inositolphosphoric acids such as inositoltriphosphoric acid and inositoltetraphosphoric acid. All of these phosphorylated inositols are useful in the present invention to form salts with streptomycin. The water-soluble salts are preferred for use in metathetical processes of preparation of streptomycin phytate. Phytic acid and its salts have been used to sequester copper, manganese and iron, to make dried fruit juices non-hygroscopic, to inhibit oxidation of mercaptans in the presence of certain metals, to prevent the formation of scale by hard water, in the paper-making industry and, by oral administration in man of the calcium-magnesium salt, to provide a source of calcium and organic phosphorus as a dietary supplement.

The preferred embodiment of the present invention is the streptomycin phytate containing three molecules of streptomycin base and one molecule of phytic acid and any water of hydration but other streptomycin phytates containing different ratios of acid and base are included within the scope of the present invention, as are their hydrated and anhydrous forms and forms containing metal ion, e. g. sodium, potassium, ammonium, calcium, magnesium, etc., when free acid groups are available for such salt formation.

Further understanding of the present invention may be obtained by reference to the following examples which are illustrative only and are not the exclusive embodiment of the invention.

Example I

Fifty grams of sodium phytate was dissolved in 300 cc. of distilled water. Charcoal was added and the solution was heated to boiling with stirring and then filtered and cooled.

Streptomycin sulfate (177.6 g.) was dissolved in 300 cc. distilled water, treated with charcoal in the cold and filtered.

The two solutions were combined and the pH was adjusted to about 8 by the addition of sodium hydroxide. The addition of seed crystals and 5,000 cc. water with stirring precipitated the product, streptomycin phytate, which was collected by filtration, washed with water and acetone, air-dried and found to have a cream color and to assay about 600 units/mgm. and to have a solubility in water of about 100–200 units/cc. at room temperature.

Example II

One hundred twenty-five cc. of 40% aqueous phytic acid was decolorized by boiling with activated charcoal (Nuchar) and filtering while hot. The cooled solution was adjusted to pH 8 by the addition of dilute aqueous sodium hydroxide.

Streptomycin sulfate (178 g.) was dissolved in 450 cc. of distilled water and combined with the above phytic acid solution. The pH remained at 8 and no precipitation occurred. The reaction mixture was divided between two 3000 cc. beakers and distilled water was added until precipitation of the product, streptomycin phytate, was complete. The final volume in each case was 3000 cc. The product after cooling was collected by filtration, washed with distilled water and acetone and dried four hours at 90° F. The yield of streptomycin phytate was 150 g. of white, amorphous material having a potency of 640 units/mgm. and a solubility in water at room temperature of about 136 u./cc.

Example III

Streptomycin phytate (0.833 g.) (200 mesh) prepared according to Example II and having a potency of about 600 u./mgm. was filled into 8 cc. silicone-coated vials and reconstituted by the addition of 2 cc. of an aqueous solution prepared by mixing lecithin (2.1 g.), Tween 40 (2.79 g.), Span 40 (0.99 g.), carboxymethyl cellulose (0.6 g.) and distilled water (q. s. at 300 cc.). The injectable product so prepared withdraws and extrudes well through a 20 gauge needle and gives extended blood levels of streptomycin in man upon injection. The therapeutic efficacy of streptomycin phytate is not yet established in man.

The streptomycin phytate of the present invention, whether alone or in combination with other therapeutic agents is used as a simple powder, as tablets, as troches, as lozenges or in capsules. Aqueous suspensions are prepared in advance or in situ when the stability of other added agents (e. g. potassium benzylpenicillin) so requires, and are a highly acceptable oral dosage form. A particularly useful oral dosage form is a suspension in a palatable, acceptable edible oil; coconut oil is preferred, particularly when free of tristearin or having a setting point less than 60° F. and gelled with an aluminum stearate (of U. S. Patent 2,507,193). The salts of the present invention are admixed with suitable buffers or pharmaceutical additives, preservatives, diluents, binders, lubricants, masticatory substances, colors, flavors, suspending agents, dispersing agents, resuspending agents, and stabilizing agents as desired.

The streptomycin phytate of the present invention, alone or in combination with other therapeutic agents, is presented for parenteral use as a suspension in an injectable oil (e. g. peanut oil), as a suspension in a gelled injectable oil (e. g. peanut oil gelled with 2% aluminum monostearate), as an aqueous suspension or as a powder to which a sterile, aqueous diluent is added before use to generate an injectable suspension. These aqueous suspensions often advantageously contain non-toxic suspending or dispersing agents, such as sodium carboxymethyl-cellulose, methylcellulose, polyvinyl alcohol, polyvinylpyrrolidone, gum tragacanth, gelatin, pectin, alginates, dextrans, gum karaya, lecithin, Spans, Tweens, Amerchols, inositolphosphoric acids and their non-toxic salts (e. g. sodium phytate,), glyceryl monostearate, Kreelon CD, polyoxyalkylenesorbitols, no more than 2.0 percent of an injectable oil such as peanut oil and condensation products, having molecular weights greater than 1500, of ethylene oxide with a condensation product of propylene oxide with propylene glycol (e. g. Pluronic F (68). On occasion, it is advantageous to actually coat the particles of streptomycin phytate, at least in part, with one of these agents, e. g. lecithin.

If desired, buffering agents are added such as sodium citrate or sodium phosphates, as when the streptomycin phytate of this invention is used with an alkali metal salt of penicillin. Small amounts of preservative are often used, e. g. phenol, cresol, or alkyl esters of p-hydroxy-benzoic acid. Useful variations in the properties of the streptomycin phytate of the present invention are obtained by altering particle size or shape, as by varying procedures of crystallization or, most easily, by mechanical means such as grinding, hammer-milling, pulverizing, or micronizing.

When desired for specific purposes, administered by appropriate routes, and rendered pharmaceutically compatible, there may be admixed with the streptomycin phytate of the present invention, and particularly those prepared for oral use, one or more of various other medicaments such as anti-histamines, sulfa drugs, (e. g. sulfadiazine, sulfamerazine, sulfamethazine, sulfacetamide, sulfanilamide, sulfapyridine, sulfathiazole, sulfapyrazine, sulfaguanidine, sulfathalidine, sulfasuxidine, sulfisoxazole, sulfamylon, phthalysulfacetamide, N'-3,4-dimethylbenzoylsulfanilamide, benzylsulfanilamide, and N'-(2-quinoxalyl)-sulfanilamide), vitamins (e. g. Vitamins A, $B_1$, $B_2$, $B_6$, $B_{12}$, and members of that family, folic acid and members of that family, Vitamins C, $D_2$, $D_3$, and E), lipotropic agents, stimulants (e. g. caffeine, amphetamines), analgesics (e. g. aspirin, salicylamide, sodium gentisate, p-acetylaminophenol, phenacetin, codeine), laxatives (e. g. phenolphthalein), sedatives (e. g. barbiturates, bromides), salts of penicillin (e. g. potassium penicillin G, procaine penicillin G, 1-ephenamine penicillin G, dibenzylamine penicillin G, N,N'-dibenzylethylenediamine dipenicillin G, N-benzyl-beta-phenethylamine penicillin G, N,N'-bis(dehydroabietyl)ethylenediamine dipenicillin G and other salts disclosed by U. S. Patent 2,627,491; these combinations are particularly useful to enable variation of the pattern of blood levels obtained), other antibiotic agents (e. g. dihydrostreptomycin, neomycin, bacitracin, polymixin, tyrothricin, erythromycin, chorotetracycline, oxytetracycline, tetracycline, chloramphenicol, magnamycin) in some cases such combinations attack a wider range of organisms or show synergistic efficacy or provide decreased toxicity with equal efficacy; and spreading agents (e. g. hyaluronidase).

Multiple combinations of such added agents are often useful, e. g. sulfadiazine and sulfamerazine to provide equal efficacy and reduced toxicity; substantially equal amounts of a non-toxic acid addition salt of streptomycin (sulfate; levo pimaric-6,8a-cis-endosuccinate) and a non-toxic acid addition salt of dihydrostreptomycin (sulfate; sulfate iodide) to provide equal efficacy and reduced toxicity; aspirin, phenacetin and caffeine; multiple vitamins.

It will be understood that, without departing from the spirit of the invention or the scope of the claims, various modifications may be made in the specific expedients described. The latter are illustrative only, and not offered in a restricting sense, it being desired that only such limitations shall be placed thereon as may be required by the state of the prior art.

*Example IV*

Two grams of sodium phytate and 2.52 g. streptomycin sulfate were each dissolved in 25 cc. portions of distilled water. The two solutions were then added to a beaker containing 50 cc. distilled water, giving a clear solution. Five grams of streptomycin sulfate dissolved in 25 cc. water was added to this reaction mixture, precipitating streptomycinphytate as an oil which solidified on stirring to a finely-divided white solid, which was collected by filtration, washed with water and acetone and found to have a potency of about 600 units/mgm. and a solubility in water at about room temperature of about 138 u./cc. and to contain by analysis, after correction for a water content of 16.05%, 34.5% carbon, 5.74% hydrogen, 12.6% nitrogen and 4.7% residue (ash). Calculated for a salt containing three molecules of streptomycin and one molecule of phytic acid: 33.8% carbon; 5.3% hydrogen; 12.0% nitrogen.

We claim:
1. The salt of streptomycin and phytic acid.
2. The solid salt of streptomycin and phytic acid.
3. Solid streptomycin phytate containing three molecules of streptomycin per molecule of phytic acid.

References Cited in the file of this patent

UNITED STATES PATENTS

| | | |
|---|---|---|
| 2,465,733 | Levis | Mar. 29, 1949 |
| 2,501,014 | Wintersteiner et al. | Mar. 21, 1950 |
| 2,560,891 | Regna et al. | July 17, 1951 |
| 2,631,143 | Braker et al. | Mar. 10, 1953 |

FOREIGN PATENTS

| | | |
|---|---|---|
| 667,751 | Great Britain | Mar. 5, 1952 |